United States Patent [19]

Takagi et al.

[11] Patent Number: 5,768,614
[45] Date of Patent: Jun. 16, 1998

[54] MONITORED STATE DISPLAY UNIT FOR MONITORING STATE CHANGE OF VARIOUS EVENTS OCCURRING ON COMMUNICATION NETWORK

[75] Inventors: Hideo Takagi; Masakazu Mori; Kinichirou Masuda, all of Kawasaki, Japan

[73] Assignee: Fujitsu Limited, Kanagawa, Japan

[21] Appl. No.: 602,705

[22] Filed: Feb. 16, 1996

[30] Foreign Application Priority Data

Jul. 3, 1995 [JP] Japan .................. 7-167463

[51] Int. Cl.$^6$ .............................. G06F 15/40
[52] U.S. Cl. .................... 395/821; 395/184.01
[58] Field of Search ................... 395/821, 822, 395/823, 825, 827, 839, 837, 184.01, 185.1

[56] References Cited

U.S. PATENT DOCUMENTS

| | | | |
|---|---|---|---|
| 5,124,690 | 6/1992 | Ito | 345/117 |
| 5,432,715 | 7/1995 | Shigematsu et al. | 364/555.01 |
| 5,483,631 | 1/1996 | Nagai et al. | 395/329 |
| 5,504,863 | 4/1996 | Yoshida | 395/184.01 |
| 5,511,191 | 4/1996 | de Leeuw Van Weenen | 395/611 |

*Primary Examiner*—Moustafa M. Meky
*Attorney, Agent, or Firm*—Helfgott & Karas, P C.

[57] ABSTRACT

A monitored state display unit for a monitoring system which has an object of improving the response to information request and easily determining fault point/fault condition. The display unit comprises event state information processing means which requests a collecting device to collect event information, and gives instructions as to the screen display method according to the state on receipt of the response notification to collection request or the state change information from the collecting device, screen information control means which controls the output of updating/displaying of displayed screen to a display means and receives the instruction input from an instruction input means, and screen transmission information control means which requests information necessary for the screen to be displayed next from the event state information processing means on receipt of the notification of input of instruction information. The display unit further comprises display method defining information storing means for defining the method of displaying on-screen mark corresponding to the event state, screen definition information storing means for defining the displayed screen, and screen transition information storing means for storing the screen transition information. The event state information processing means handles the information which is not transmitted from the collecting device as information of unchanged state, and changes the method of displaying mark for the mark of fault point.

12 Claims, 9 Drawing Sheets

MONITORED STATE DISPLAY UNIT FOR MONITORING STATE CHANGE OF VARIOUS EVENTS OCCURRING ON COMMUNICATION NETWORK

BACKGROUND OF THE INVENTION (1) Field of the Invention

The present invention relates to a monitoring system and, more particularly, to a monitoring system which monitors and displays state changes on a communication network.

(2) Description of the Related Art

In a communication network monitoring system and facility monitoring system, the range to be monitored has expanded, and the amount of information to be collected has increased, for example, to several hundreds of thousands of points to be monitored in recent years, so that the load to be processed, such as transmission of information between a collecting device for collecting change information and a plurality of monitor terminals, and screen display at monitor terminals, has increased. For this reason, when information is requested from a monitor terminal to the collecting device, the response to the request slows down, or when a fault occurs, it becomes difficult to determine the fault occurrence point and the fault condition rapidly and exactly. Therefore, a monitoring system is demanded which can respond to the information request promptly and, if a fault occurs, can determine the fault occurrence point/fault condition rapidly and exactly.

A conventional monitoring system comprises a collecting device (host device) for collecting change information of various events in the monitored system and a plurality of monitor terminals connected to the collecting device, so that when an event changes, state change data is transmitted from the collecting device to each of the monitor terminals. Therefore, if several tens of monitor terminals are connected to one collecting device, the data which must be transmitted increases when the state change of event occurs, so that the load on the collecting device and the transmission lines increases, which causes the processing speed to decrease.

Most of the monitor terminals are of an indicator panel type in which the display unit has lamps which individually display the fault occurrence point and the fault condition. When an indicator panel is used for the monitor terminal, the amount of information for determining the fault occurrence point/fault condition is small. Therefore, if a fault occurs, the operator's experience or the like is relied upon to determine the fault occurrence point/fault condition.

However, when the communication network expands and the range to be monitored becomes wide, the amount of collected information increases, the load of processing increases to transmit information from the collecting device to each monitor terminal at the time of event occurrence or in reply to the request from the monitor terminal and the load of processing to display the transmitted information also increases. As a result, the transmission takes much time, and the response slows down.

SUMMARY OF THE INVENTION

An object of the present invention is to provide a monitored state display unit for a monitoring system in which the amount of information transmitted from a collecting device to a monitor terminal is minimized to increase communication speed, the response time from request to display on the monitor terminal is improved when the monitor terminal requests information from the collecting device, and a fault point/fault condition is determined easily.

To achieve the above object, there is provided a monitored state display unit for a monitoring system which monitors a state change of various events occurring on a communication network. The monitored state display unit for a monitoring system comprises event state information processing means which requests a collecting device, which collects information from a sensor for detecting the state change of the events, to collect event information, or gives instructions as to a method of displaying an on-screen mark corresponding to the event state information on receipt of the notification of response to the request for collecting event information from the collecting device or the one-way notification of state change information from the collecting device; display method defining information storing means which defines and stores a method of displaying an on-screen mark corresponding to an object being monitored and the event state of the object being monitored as a variable element; screen information control means which controls the output of updating/displaying of displayed screen in accordance with the screen display method, and receives the input of instruction information; screen definition information storing means which stores information defining a displayed screen, and controls an updated screen in updating/displaying the displayed screen with a control number; screen transition information control means which requests information necessary for the screen to be displayed next from the event state information processing means on receipt of the notification of input of the instruction information; screen transition information storing means which stores screen transition information when the screen is changed; display means which performs updating/displaying of the displayed screen; and instruction input means which inputs the instruction information.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, the outline of an embodiment of the present invention will be described with reference to the drawings.

Figure 1:
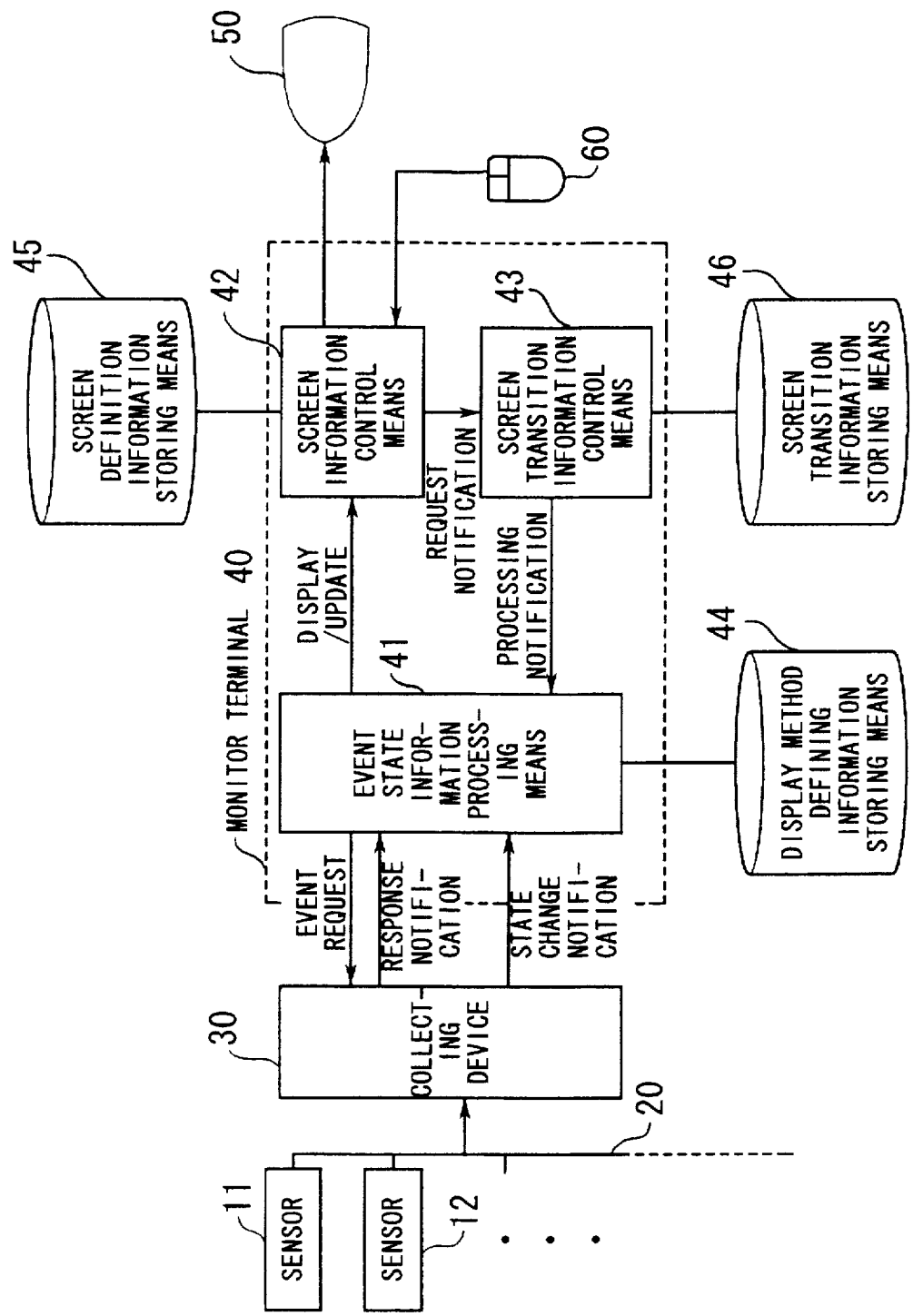
FIG. 1 is a schematic diagram showing a configuration of a monitored state display unit for a monitoring system in accordance with the present invention.

FIG. 1 is a schematic diagram showing a configuration of a monitored state display unit for a monitoring system in accordance with the present invention.

A monitoring system for a communication network typically shown in FIG. 1 includes sensors 11, 12, . . . which are installed in, for example, branch offices and local business offices to detect the state change of event to be monitored, a collecting device 30 which is installed, for example, at a central communication network operation center to collect and control the state change information sent from the sensors 11, 12, . . . via a network 20, and a plurality of monitor terminals 40 (one monitor terminal 40 is illustrated in FIG. 1) which are connected to the collecting device 30 via another network and operates independently of the collecting device 30, all of which are connected to each other by communication network. To each monitor terminal 40 are connected display means 50, such as a CRT display unit or a projector device, for displaying network information on a screen and instruction input means 60, such as a mouse or a keyboard, for inputting the screen transition instruction for changing the displayed screen. The monitor terminal 40 has a buzzer (not illustrated) which can output sounds of two tones.

The monitor terminal 40 includes event state information processing means 41, screen information control means 42, and screen transition information control means 43. The event state information process means 41 issues a request for collecting event information to the collecting device 30, and when it receives a notification in response to a request from the collecting device 30 or when it receives one-way state change information from the collecting device 30, the event state information processing means 41 gives instructions to the screen information control means 42 as to the screen display method. The screen information control means 42 controls the display means 50 to output updating/displaying screens in accordance with the screen display method, and receives input of instruction information from the instruction input means 60. The screen transition information control means 43 requests information necessary for the screen to be displayed next from the event state information processing means 41 on receipt of notification of the input instruction information. Display method defining information storing means 44, which stores the definition information of display method of on-screen mark corresponding the event state, is connected to the event state information processing means 41. Screen definition information storing means 45, which stores the definition information of screen, is connected to the screen information control means 42. Screen transition information storing means 46, which stores the transition information of screen, is connected to the screen transition information control means 43.

Basic image information necessary for screen display is defined and stored in the display method defining information storing means 44 and the screen definition information storing means 45. For a screen display, the definition is retrieved which corresponds to the state information of each event at the time of collection, and the screen is updated/displayed in accordance with the display method defined there. The screen transition information storing means 46 stores the history of the transition information obtained when a screen changes, and the screen is updated/displayed in accordance with the transition information by scrolling up.

It is assumed that the events to be monitored are displayed with marks of square, circle, triangle, star or the like on the monitor screen, and a fault occurs on a certain event. At this time, the display method of the mark corresponding to the event at the point where the fault occurs must be changed according to the event state. Since the event and the display method for each event state are defined in the display method defining information storing means 44, it is possible to retrieve the definition corresponding to the state information of each event at the time when information is collected, and to perform updating/displaying of the monitor mark according to the display method defined there.

Described below is an example of display method in which a certain mark i changes the display method according to the state information about three events (a, b, c). It is assumed that the display method is defined as follows regarding monitor mark i.

(0, 0, 0): Continuously lit display in blue/no buzzer output (1, *, *): Continuously lit display in yellow/first buzzer output (0, *, *): Flickering display in red/second buzzer output The above definition indicates that when the state information about events a, b, and c are all "0", the point corresponding to monitor mark i is a normal condition, and monitor mark i on the screen is continuously lit in blue. In the case where the state of event a is "1" and the states of the other events b and c are arbitrary when the state information of event is collected, monitor mark i is continuously lit in yellow, and a first buzzer sounds. In the case where the state of event a is "0" and the states of other events b and c are arbitrary when the state information of event is collected, monitor mark i is lit flickeringly in red, and a second buzzer sounds.

There are basically three cases in which the monitor screen is updated according to the event state on the monitor terminal 40 side: a case in which the monitor screen is updated by the latest information when the event state changes, a case in which the monitor screen is updated when the monitor screen is changed by operator's request, and a case in which the monitor screen is updated by regular updating. These three cases will be described below.

When a sensor detects a state change of event and the collecting device 30 collects the event state change information, the monitor terminal 40 receives one-way notification of state change information from the collecting device 30. The notification timing of event state change information depends on the collecting device 30 side. The collecting device 30 can transmit information of plural screens at one time, and the information which is not transmitted is handled as information of unchanged event state. That is to say, only the information of state change is transmitted from the collecting device 30, so that the amount of transmitted information is minimized. On receiving notification from the collecting device 30, the event state information processing means 41 judges whether that information relates to the currently displayed screen, updates the mark and the like on the screen by referring to the definition information of display method stored in the display method defining information storing means 44, and asks the screen information control means 42 for re-display of screen. The screen information control means 42 outputs the updated screen to the display means 50, so that the updated screen is displayed there. For the screen update processing at the monitor terminal 40 as well, only the screen on which the display method has been changed, for example, the display color has been changed, or the display has changed from continuously lit display to flickering display is processed, by which the transmitting and processing load is lowered.

When the operator inputs instruction of screen transition through the instruction input means 60 to switch the object being monitored, the screen information control means 42 notifies the screen transition information control means 43 of the screen transition request. The screen transition information control means 43 decides the screen to which the currently displayed screen will be switched, and sends the result to the event state information processing means 41. The event state information processing means 41 requests the collecting device 30 to collect the state information of event relating to the screen to be displayed next. When the response is transmitted from the collecting device 30, the event state information processing means 41 compiles the transmitted information into the information necessary for the display of the next screen, decides the mark display method according to the state information, and notifies the screen information control means 42 of the method. The screen information control means 42 composes the screen on the basis of the screen layout information stored in the screen definition information storing means 45, and outputs the screen to the display means 50, so that the changed screen is displayed. When the screen is changed, the transmitted information about the changed screen is screen number only, so that the amount of information is reduced, by which the transmitting and processing load is reduced.

When the screen is updated regularly, the event state information processing means 41 regularly requests only the information necessary for the current display from the collecting device 30. When the response is transmitted, the event state information processing means 41 decides the mark display method for re-display, and asks the screen information control means 42 for re-display of screen. The screen information control means 42 outputs the information of re-displayed screen to the display means 50, so that the information is displayed there. The collection intervals for regular updating are set using a timer at the event state information processing means 41. The information collection for plural screens can be requested by one request. The information which is not transmitted in response to the request is handled as "0" representing no state change. The collecting device 30 sometimes cannot be operated as a system because it uses large amount of system resources at one time if a state change occurs. For this reason, the response overflow is specified such that when the system resources are used to a predetermined value, the event information transmitted subsequently is abandoned to reduce the system load. When a large number of state changes occur in regular updating, the response notification of only the collected event information is made, and then, when the related remaining event information is collected after a predetermined time has elapsed, the response notification is made again, by which the monitor screen is updated.

Three basic methods of updating the monitor screen have been described above, but actually these updating methods are used in combination.

Next, the method of displaying the changed screen will be described. First, the initial screen is displayed, and then the initial screen is changed into a necessary monitor screen.

Figure 2:
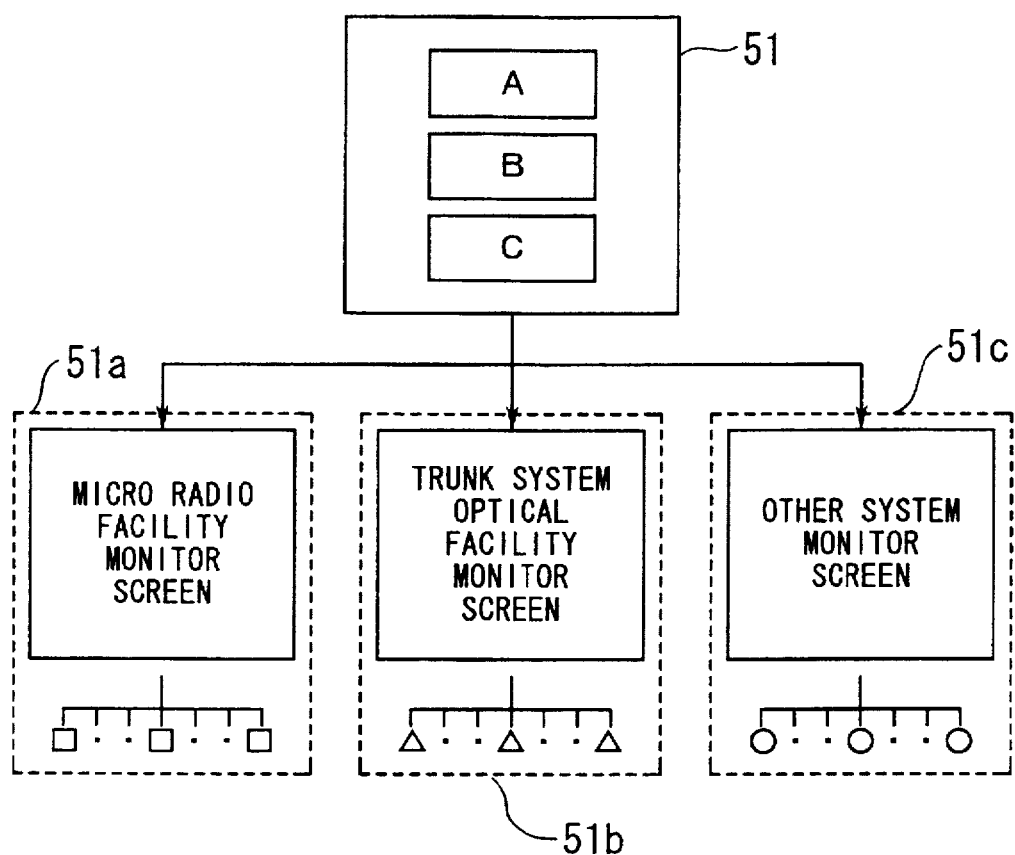
FIG. 2 is a diagram showing a typical case where a monitor screen is formed for each system.

FIG. 2 is a diagram showing a typical case where a monitor screen is formed for each system.

A collective monitor selection screen 51 is displayed as the initial display. On this collective monitor selection screen 51, the events being monitored are classified according to the system, and displayed in the form of, for example, mark or button. Here, button "A" collectively displays the objects being monitored regarding, for example, a micro radio facility, button "B" collectively displays the objects being monitored regarding, for example, a trunk system optical facility, and button "C" collectively displays the objects being monitored regarding the other systems. These buttons are arranged in parallel on one screen. The buttons may be arranged in a geometrical form or in such a form that the buttons are positioned on a map.

By pressing a button using, for example, a mouse, the screen regarding that system is displayed. By pressing button "A", a micro radio facility monitor screen 51a is displayed. By pressing button "B", a trunk system optical facility monitor screen 51b is displayed. By pressing button "C", the other systems monitor screen 51c is displayed. Each screen comprises a monitor screen on which objects being monitored in each system are displayed with marks, for example, and comprises icons for displaying the objects being monitored by being classified. When an icon is pressed by using, for example, a mouse, the object being monitored of the classification allotted to this icon is displayed on the monitor screen. For example, if the object being monitored regarding a radio set of micro radio system for communication network is allotted to an icon, by pressing the icon, the monitor screen is changed into a screen on which the radio sets of micro radio system are arranged, and the points being monitored are displayed with marks. If a fault is present in the system, the mark of the appropriate point being monitored is highlighted, preferably displayed by flickering, so that the fault condition can be determined by the display method.

Figure 3:
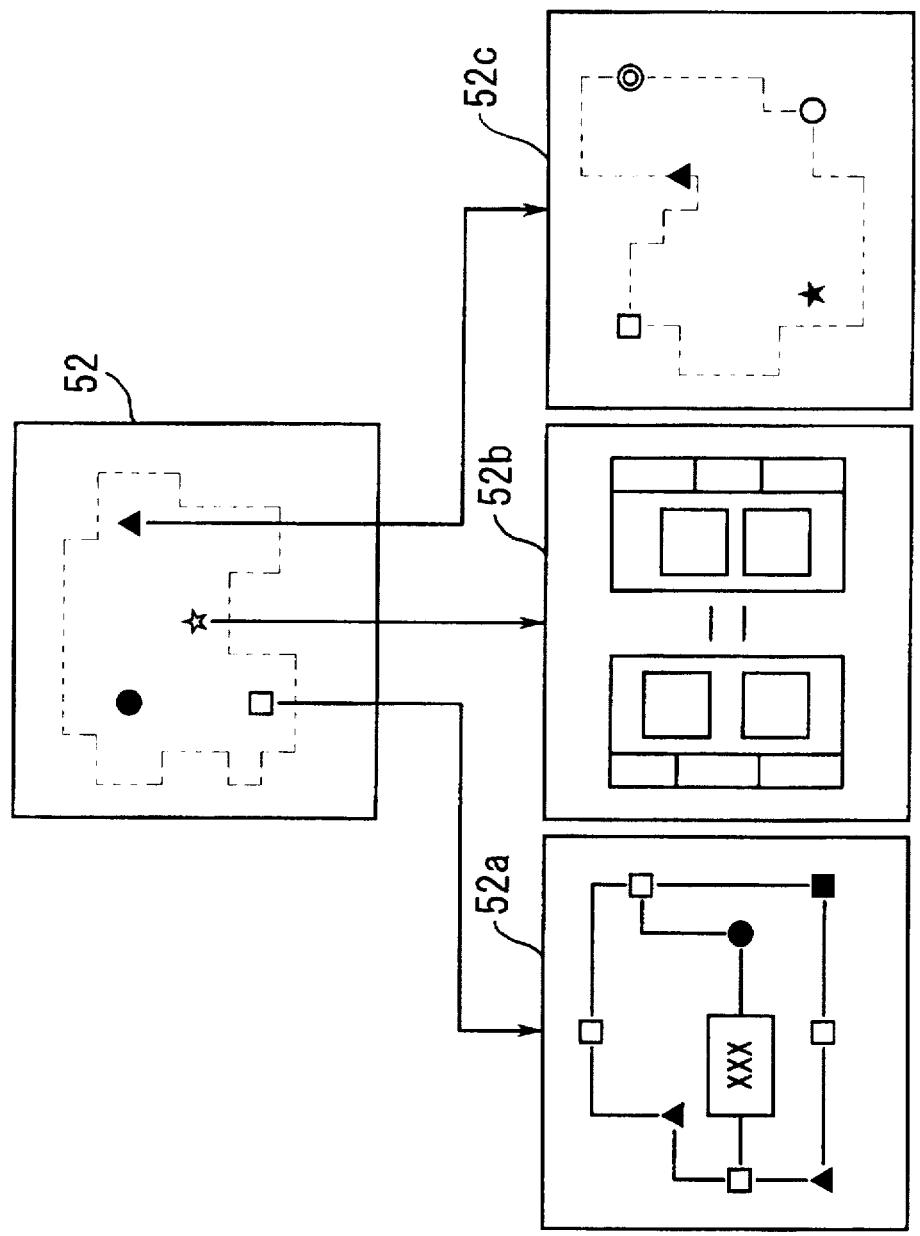
FIG. 3 is a diagram showing a typical case in which a monitor screen corresponding to a mark is formed.

FIG. 3 is a diagram showing a typical case in which a monitor screen corresponding to a mark is formed.

On a collective monitor screen 52, for example, branch offices, local business offices, and the like existing in a district are displayed with marks together with their names. To these marks, the respective relating monitor screens are pasted. According to an example shown in FIG. 3, to the square mark is pasted a monitor screen 52a representing a local network in the point being monitored, to the star mark is pasted an opposite facility monitor screen 52b for displaying, for example, a micro radio facility of the point being monitored of this mark and a micro radio facility of the point being monitored connected to the point being monitored of this mark by the micro radio, and to the black triangle mark is pasted a monitor screen displaying the more detailed points being monitored existing in the branch office or the local business office with marks. Thus, the monitor screens are formed hierarchically in such a manner that to a mark lying on a monitor screen is pasted the related detailed monitor screen.

If a fault occurs at any of the points being monitored displayed with marks, the mark of the fault point is highlighted, so that it can be judged that a fault has occurred in the branch office or local business office. By clicking the highlighted mark portion by using a mouse, the display screen is changed into a detailed monitor screen of the point being monitored of the mark, and the mark allotted to the place including the fault point is highlighted. Unless the specific fault point and the fault condition can be identified, the display screen is changed into a more specific monitor screen by clicking the highlighted mark by using a mouse. By arranging the monitor screens hierarchically as described above, the fault point and the fault condition can be determined by selecting and specifying the highlighted marks sequentially.

In the configuration of monitor screens shown in FIGS. 2 and 3, a plurality of monitor screens can be displayed simultaneously on one CRT display device, that is, multiple display can be accomplished to simultaneously monitor the screens of the systems or to monitor the state change information for each observation station while comparing.

Figure 4:
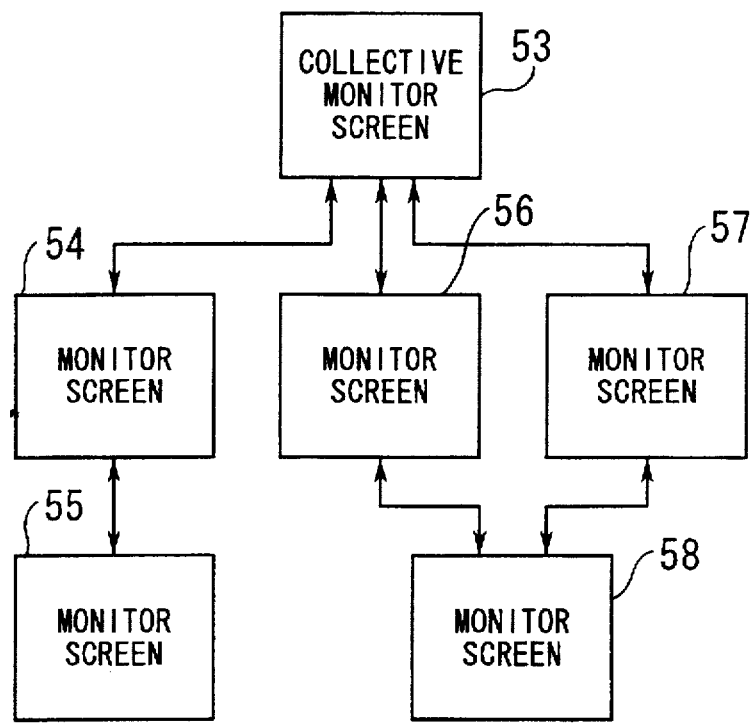
FIG. 4 is a diagram showing an example of transition of monitor screen.

FIG. 4 is a diagram showing an example of transition of monitor screen.

When changing the monitor screen from the initial screen to the desired screen on which, for example, the fault point and the fault condition can be determined, the monitor screen is changed sequentially, and the transition history is stored in the screen transition information storing means 46 (FIG. 1). The example in FIG. 4 shows the case where the monitor screen is changed from an initially displayed collective monitor screen 53 to a monitor screen 55 through a monitor screen 54, and the case where the monitor screen is changed from the collective monitor screen 53 to a monitor screen 58 through a monitor screen 56 or a monitor screen 57. The screen transition information of these monitor screens 54 to 58 is stored, so that the monitor screen can be returned to the previous monitor screen by specifying a keyword. The maximum number of screens which can be stored can be defined as variable element information. If the number of stored screens exceeds the defined maximum, the information on the oldest screen is abandoned, so that the monitor screens from the current screen up to the number of defined screens can be displayed.

When changing the monitor screen to a previously displayed monitor screen, since the type of information on the screen displayed before is known, the monitor terminal 40 may request the collection of that information only. The response from the collecting device 30 transmits only the information about the event subjected to state change. Therefore, the monitor terminal 40 compiles the information into the information necessary for monitor screen, and then specifies the display method corresponding to the compiled information, by which updating (re-display) of monitor screen is performed.

Figure 5:
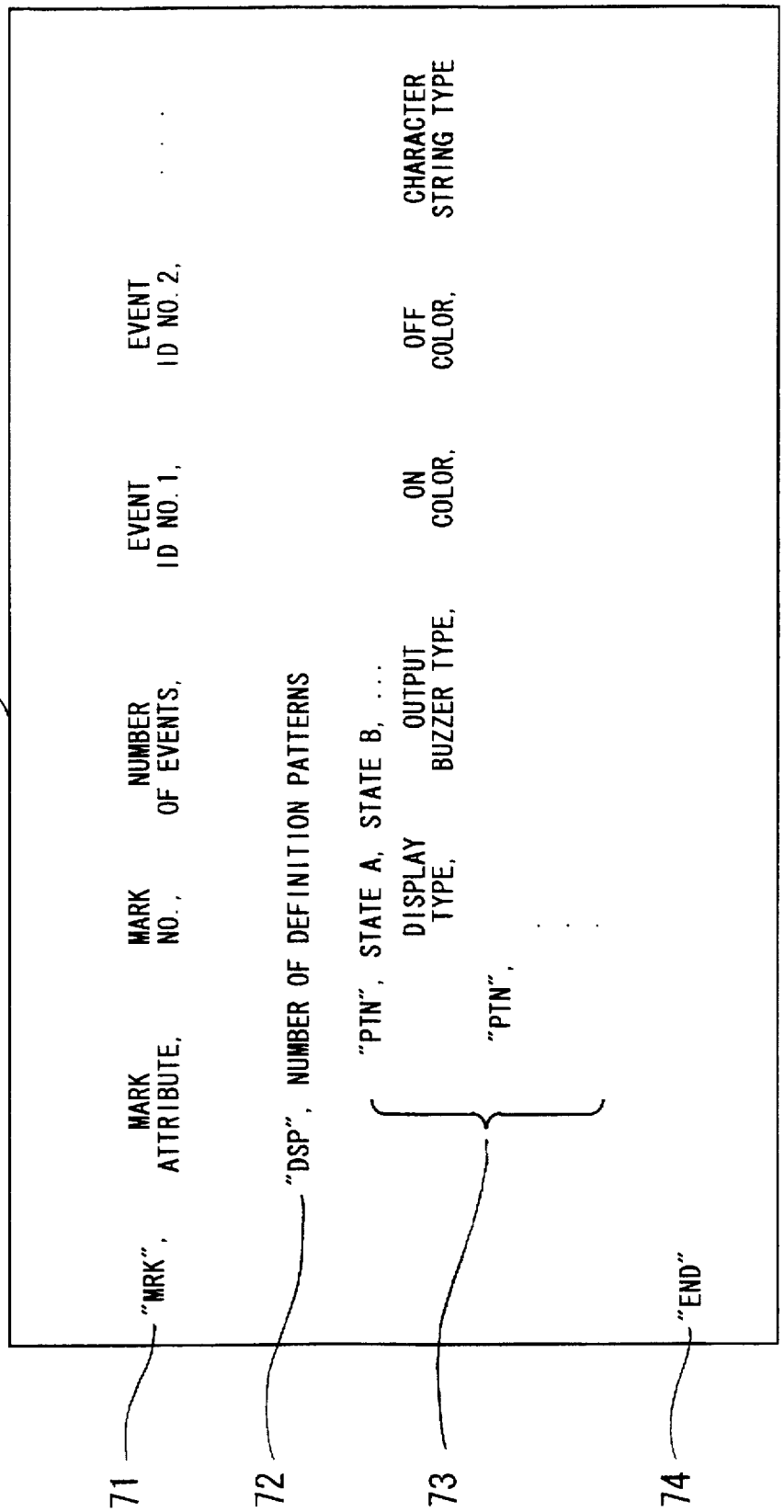
FIG. 5 is a diagram showing a typical configuration of mark display method defining information displayed on a monitor screen.

FIG. 5 is a diagram showing a typical configuration of mark display method defining information displayed on a monitor screen.

Mark display method defining information 70 includes a definition start section 71 starting with "MRK", a pattern number specifying section 72 starting with "DSP", a pattern defining section 73 starting with "PTN" for defining patterns by specified numbers, and a definition end section 74 represented by "END". The definition start section 71 defines "mark attribute" for specifying the type of defined mark: whether the mark is a background mark, a previously prepared monitor mark such as ○, □, or △, or a symbol mark whose shape can freely be defined by the user, "mark number" allotted in each type, "number of events" representing the number of events collected for the mark, and "event identification number" of the number corresponding to the number of events. The pattern number specifying section 72 specifies the number of patterns to be defined. The pattern defining section 73 specifies a combination pattern of event state information, and specifies, on the next line, "display type" which specifies whether the display is a continuously lit display, an extinguished display, or a flickering display, "output buzzer type" which specifies the tone of buzzer outputted simultaneously with the display according to the display type, "ON color" which specifies the color of continuously lit display, "OFF" color which specifies the color of flickering display, and "character string type" which defines character strings such as "NORMAL", "CAUTION", and "TROUBLE".

The following is an example of definition of display method defining information in the case where mark display is made on a monitor screen according to the event state.

```
"MRK", 1, 1, 3, 1, 2, 3
"DSP", 3
"PTN", 0, 0, 0
      ,1,0, blue, -1, 0
"PTN", 1, -1, -1
      ,1, 0, yellow, -1, 0
"PTN", 1, 1, 1
      ,1, 0, red, black, 0
"END"
```

The above example defines an operation in the case where:

regarding the mark with mark attribute of monitor mark "1", mark number of "1", there are "3" events, and three types of state information having event identification number of "1, 2, 3". Value "-1" is used when the value is not specified. The above example also defines that the initial value of state information is (0, 0, 0), the display type is continuously lit display "1", the output buzzer type is none "0", the ON color is "blue", the OFF color is omitted "-1", and the character string type is none "0".

When the state information of event identification number "1" is given with "1" by the occurrence of state change, the state information pattern becomes (1, 0, 0), and the state information definition patterns defined by "PTN" are retrieved from the above. In the above example, since the definition pattern of (1, -1, -1) matches first, the mark is updated to yellow continuously lit display.

When (0, 1, 1) is given as the state information, the mark is not updated because there is no matching patterns when retrieving the definition patterns.

Further, when (1, 1, 1) is given as the state information, the mark is updated to flickering display of red and black.

The following is an example of definition of display method defining information in the case where numerical display is made on a monitor screen according to the event state.

```
"MRK", 5, 1, 3, 1, 2, 3
"DSP", 3
"PTN", 0, 0, -1
      ,1, 0, blue, -1, 0
"PTN", 1, -1, -1
      ,1, 0, yellow, -1, 0
"PTN", 1, 1, -1
      ,1, 0, red, black, 0
"END"
```

The above example defines an operation in the case where:

regarding the mark with mark attribute of numerical information "5", mark number of "1", there are "3" events, and three types of state information having event identification number of "1, 2, 3". Value "-1" is used when the value is not specified. The above example also defines that the initial value of state information is (0, 0, 0), the display type is continuously lit display "1", the output buzzer type is none "0", the ON color is "blue", the OFF color is omitted "-1", and the character string type is none "0". The event representing the numerical information corresponds to the last event in defining the event identification number (event identification number "3"), and the initial value of numerical information is (0.0) in this example.

When the state information of event identification numbers "1" and "3" are given with "1" and "1, 3" by the occurrence of state change, the state information pattern becomes (1, 0, 1, 3), and the state information definition patterns defined by "PTN" are retrieved from the above. In the above example, since the definition pattern of (1, −1, −1) matches first, the numerical information is updated to a value of "3, 1" by yellow continuously lit display.

For example, when (0, 1, 5, 2) is given as the state information, the numerical information is not updated because there is no matching patterns when retrieving the definition patterns.

The following is an example of definition of display method defining information in the case where character string display is made on a monitor screen according to the event state.

```
"MRK", 6, 1, 3, 1, 2, 3
  "DSP", 3
    "PTN", 0, 0, 0
      ,1, 0, blue, −1, "normal"
    "PTN", 1, −1, −1
      ,1, 0, yellow, −1, "caution"
    "PTN", 1, 1, 1
      ,1, 0, red, black, "trouble"
"END"
```

The above example defines an operation in the case where:

regarding the mark with mark attribute of character string information "6", mark number of "1", there are "3" events, and three types of state information having event identification number of "1, 2, 3". Value "−1" is used when the value is not specified. The above example also defines that the initial value of state information is (0, 0, 0), the display type is continuously lit display "1", the output buzzer type is none "0", the ON color is "blue", the OFF color is omitted "−1", and the character string type is "NORMAL". The character string information is not received directly as the state change information, but is defined beforehand. The defined character string is displayed by the state information pattern.

When the state information of event identification number "1" is given with "1" by the occurrence of state change, the state information pattern becomes (1, 0, 0), and the state information definition patterns defined by "PTN" are retrieved from the above. In the above example, since the definition pattern of (1, −1, −1) matches first, the character string information is updated to a character string of "CAUTION" by yellow continuously lit display.

For example, when (0, 1, 5, 2) is given as the state information, the character string information is not updated because there is no matching patterns when retrieving the definition patterns.

The following is an example of definition of display method defining information in the case where buzzer output is made on a monitor screen according to the event state.

```
"MRK", 6, 1, 3, 1, 2, 3
  "DSP", 3
    "PTN", 0, 0, 0
      ,1, 0, blue, −1, "NORMAL"
    "PTN", 1, −1, −1
      ,1, 1, yellow, −1, "CAUTION"
    "PTN", 1, 1, 1
      ,1, 2, red, black, "TROUBLE"
"END"
```

The above example defines an operation in the case where:

regarding the mark with mark attribute of character string information "6", mark number of "1", there are "3" events, and three types of state information having event identification number of "1, 2, 3". Value "−1" is used when the value is not specified. The above example also defines that the initial value of state information is (0, 0, 0), the display type is continuously lit display "1", the output buzzer type is none "0", the ON color is "blue", the OFF color is omitted "−1", and the character string type is "NORMAL". The character string information is not received directly as the state change information, but is defined beforehand such that the defined character string is displayed by the state information pattern.

When the state information of event identification number "1" is given with "1" by the occurrence of state change, the state information pattern becomes (1, 0, 0), and the state information definition patterns defined by "PTN" are retrieved from the above. In the above example, since the definition pattern of (1, −1, −1) matches first, the character string information is updated to a character string of "CAUTION" by yellow continuously lit display, and the buzzer of tone type "1" is sounded.

For example, when (0, 1, 1) is given as the state information, the character string information and the buzzer output are not updated because there is no matching patterns when retrieving the definition patterns.

Figure 6:
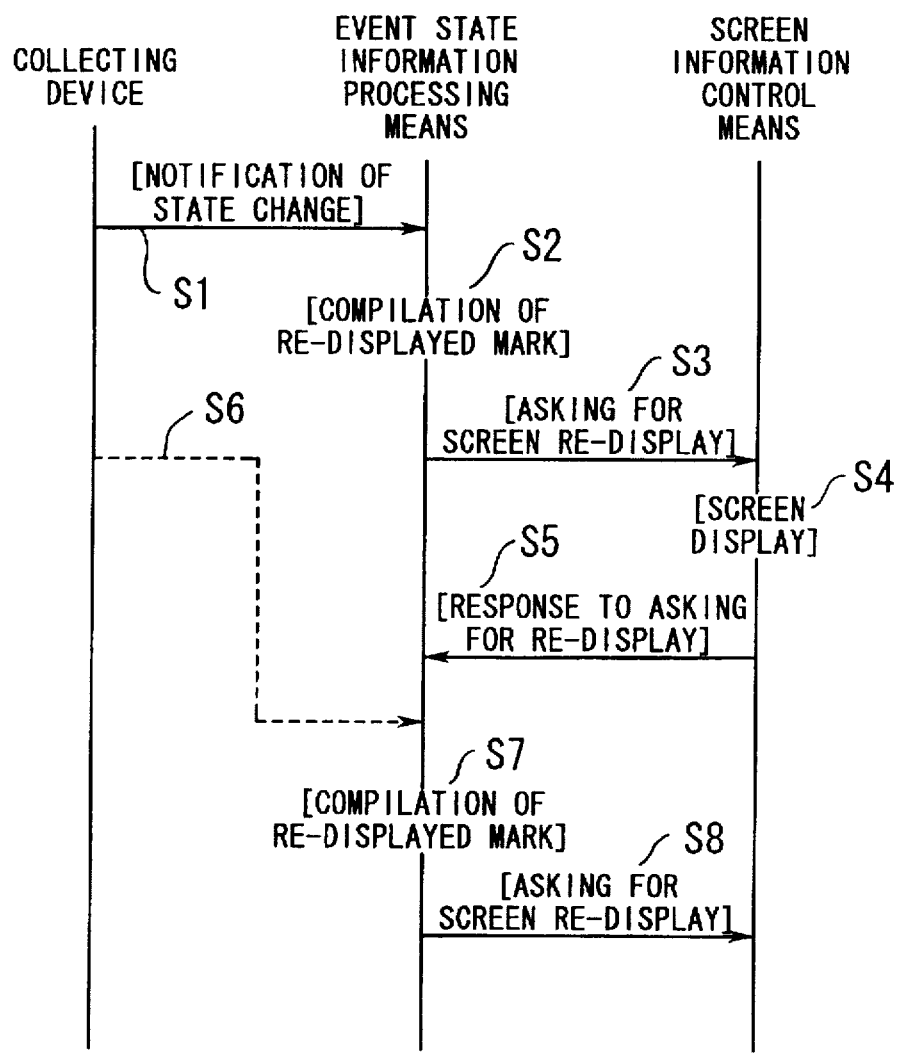
FIG. 6 is a diagram showing an operation sequence in the case where the monitor screen is updated by the latest information when event state changes.

FIG. 6 is a diagram showing an operation sequence in the case where the monitor screen is updated by the latest information when event state changes.

This operation sequence explains the operation of the monitor terminal 40 in the case where the event state change information is given to the monitor terminal 40 from the collecting device 30, and the mark of monitor screen is updated with the notification of this information as a trigger. The state change information in this case is one-way information given from the collecting device 30 mainly in emergency, and is not requested by the event information from the monitor terminal 40.

In this case, information is transmitted between the collecting device 30, the event state information processing means 41 and the screen information control means 42 of the monitor terminal 40, and the display means 50. In FIG. 6, the vertical direction indicates the progress of time.

First, when state change information is transmitted from the collecting device 30 (S1), the event state information processing means 41 judges whether the transmitted information relates to the currently displayed screen. If the transmitted information does not relate to the currently displayed screen, the information is abandoned. Thus, only the information necessary for screen display of the transmitted information is compiled. Then, the mark display method is decided from the compiled state information (S2). On receipt of the request for updating (re-displaying) the screen from the event state information processing means 41 (S3), the screen information control means 42 updates the screen according to the transmitted information, and displays the information on the display means 50 (S4). The screen information control means 42 checks whether the updating of screen has been completed normally or abnormally, and sends the result to the event state information processing means 41 which requested the updating (S5). If the state change information is given again during the updating of screen (S6), after the processing of the updating has been completed, the event state information processing means 41 again compiles the re-displayed mark and specifies the display method (S7). Thus, the event state information processing means 41 asks the screen information control means 42 for the re-display of screen (S8).

Figure 7:
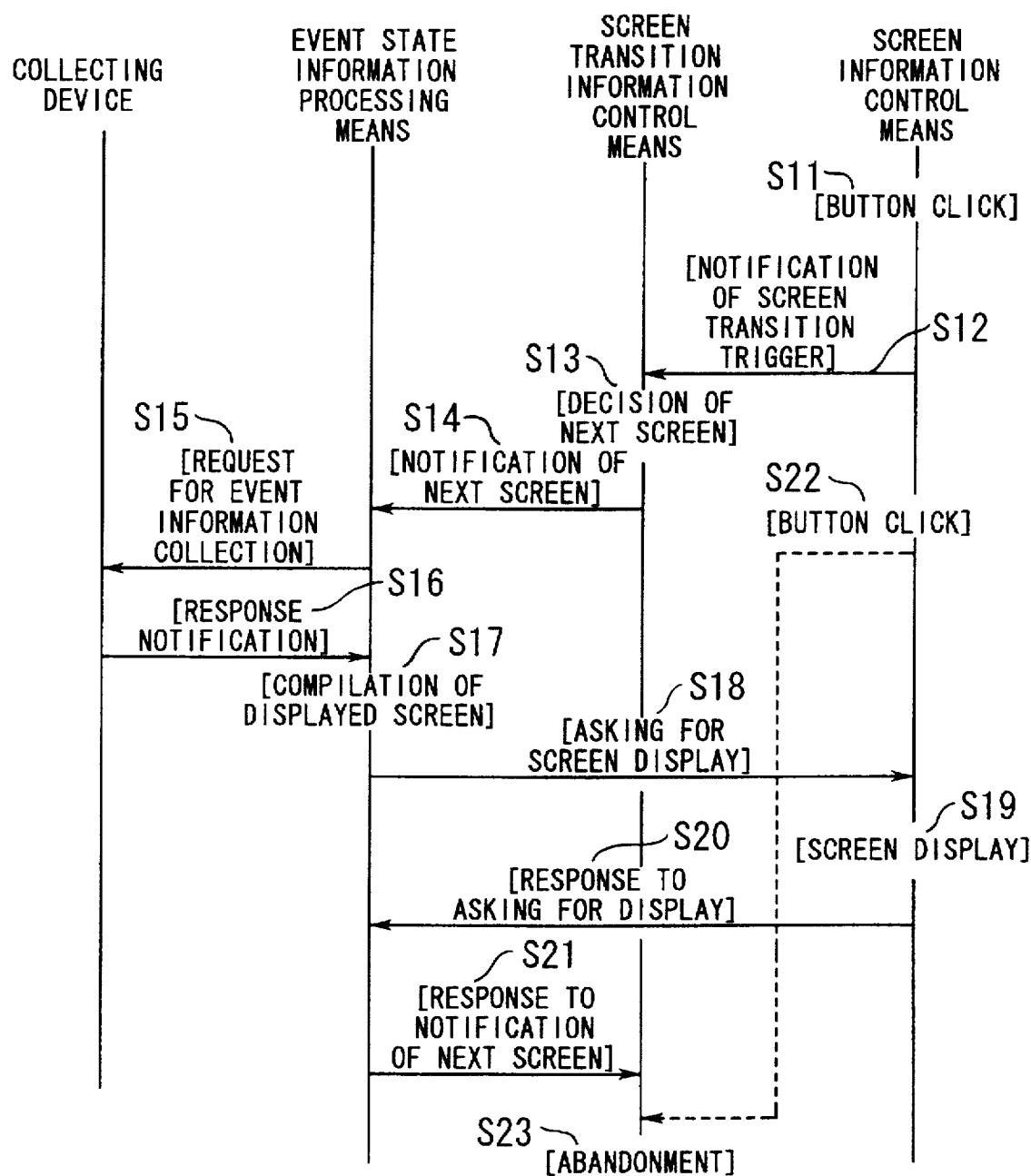
FIG. 7 is a diagram showing an operation sequence in the case where the monitor screen is updated when the monitor screen changes.

FIG. 7 is a diagram showing an operation sequence in the case where the monitor screen is updated when the monitor screen changes.

This operation sequence explains the operation of monitor terminal 40 in the case where the monitor screen displayed on the display means 50 is changed into another monitor screen. The trigger for changing the screen is the button click using a mouse or the key input from a keyboard by the user.

In this case, information is transmitted between the collecting device 30, the event state information processing means 41, the screen information control means 42, and screen transition information control means 43 of the monitor terminal 40, the display means 50, and the instruction input means 60. In FIG. 7, the vertical line indicates the progress of time.

When button click is performed by using, for example, a mouse (S11), the screen information control means 42 issues a request for changing the screen to the screen transition information control means 43 (S12). The screen transition information control means 43 decides the screen into which the current screen is changed next in response to the transition request (S13), and sends the result to the event state information processing means 41 (S14). The event state information processing means 41 requests the collecting device 30 to collect the event state information relating to the told screen (S15). The collecting device 30 transmits the event state information relating to the changed screen to the event state information processing means 41 as the response notification to the collection request (S16). The event state information processing means 41 compiles the transmitted event state information into the information necessary for the changed screen, decides the mark display method on the changed screen in accordance with the event information (S17), and asks the screen information control means 42 for screen display (S18). The screen information control means 42 makes a display on the display means 50 in accordance with the transmitted information (S19). The screen information control means 42 checks whether the screen transition has been completed normally or abnormally in response to the asking for display, and transmits the result to the event state information processing means 41 (S20). The event state information processing means 41 transfers the result to the screen transition information control means 43 (S21).

When a next transition request is inputted again by button click using a mouse during the operation of a transition request of monitor screen (S22), that notification is abandoned (S23).

Figure 8:
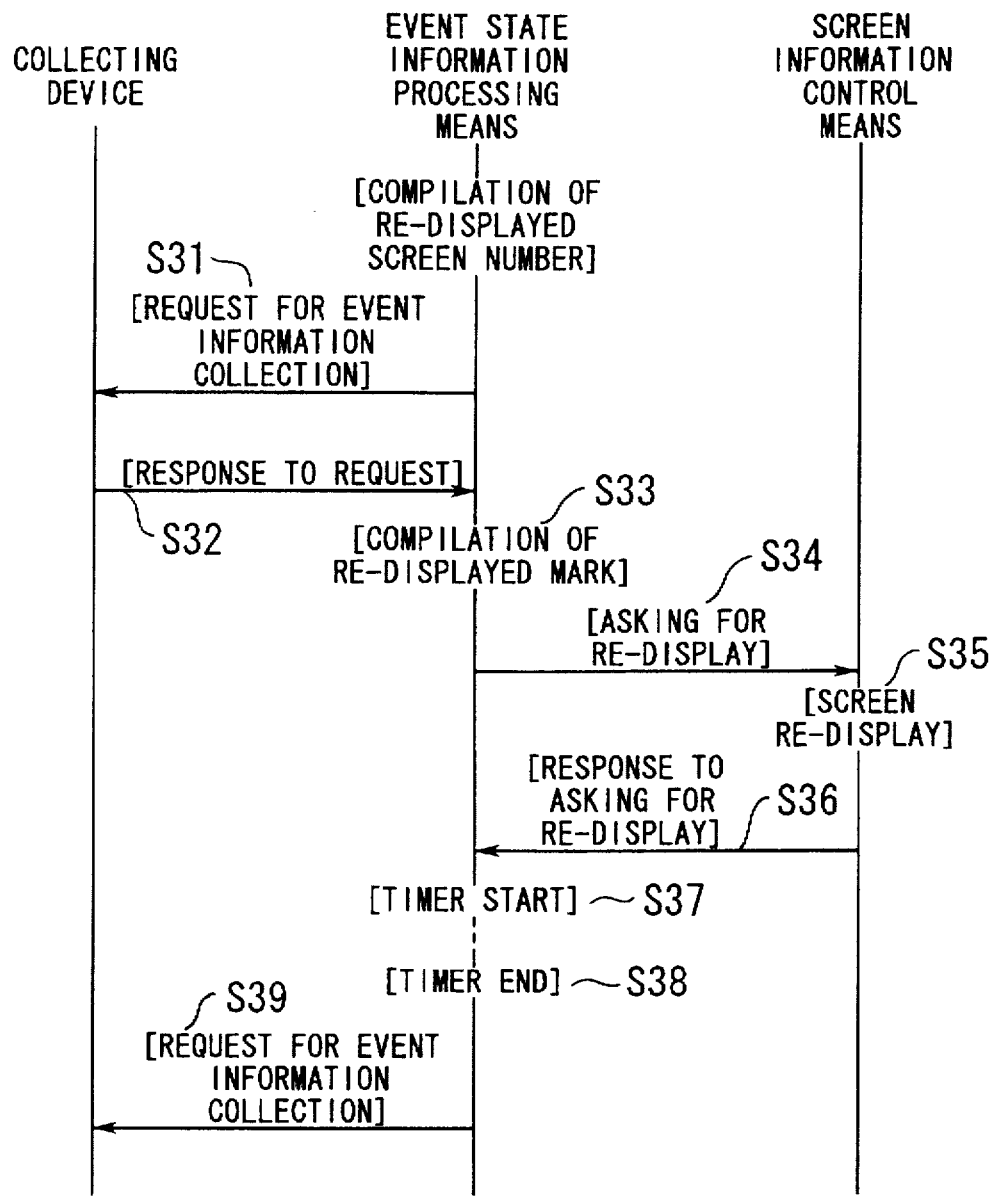
FIG. 8 is a diagram showing an operation sequence in the case where the monitor screen is updated by regular updating.

FIG. 8 is a diagram showing an operation sequence in the case where the monitor screen is updated by regular updating.

In this case, the monitor screen is updated to reflect the state of event changing as time-series information on the screen. To lighten the load of the collecting device 30, time count is started just after the execution of screen updating, and information is collected again after a predetermined period of time has elapsed.

In this case, information is transmitted between the collecting device 30, the event state information processing means 41 and the screen information control means 42 of the monitor terminal 40, and the display means 50. In FIG. 8, the vertical line indicates the progress of time.

First, the event state information processing means 41 compiles the re-displayed screen number, and requests the collecting device 30 to collect event state information for only the information regarding the currently displayed screen (S31). The request for collection is completed at one time for all events regarding the displayed screen. The collecting device 30 gives the event state information processing means 41 the state information of event relating to the currently displayed screen as the response notification to the collection request (S32). The given information is information other than "0", that is, only information about state change. The information for a plurality of screens is given at the same time. The event state information processing means 41 compiles the collected state information, decides the mark display method on the screen being currently displayed in accordance with the compiled information (S33), and asks the screen information control means 42 for the re-display of screen (S34). The screen information control means 42 re-displays the screen in accordance with the given information (S35). Then, the normal/abnormal completion of re-display of screen is told to the event state information processing means 41 as the response to the asking for re-display (S36). At this time, a timer starts time count (S37). When the timer finishes the time count (S38), the event state information processing means 41 again requests the collecting device 30 to collect event state information for only the information regarding the currently displayed screen (S39).

In responding from the collecting device 30, if the information cannot be transmitted at one time, the information until the response overflow specified by the collecting device 30 occurs is first transmitted, and then, after a predetermined period of time has elapsed, when the relevant remaining event information has been collected, the response notification is given again to update the monitor screen.

Figure 9:
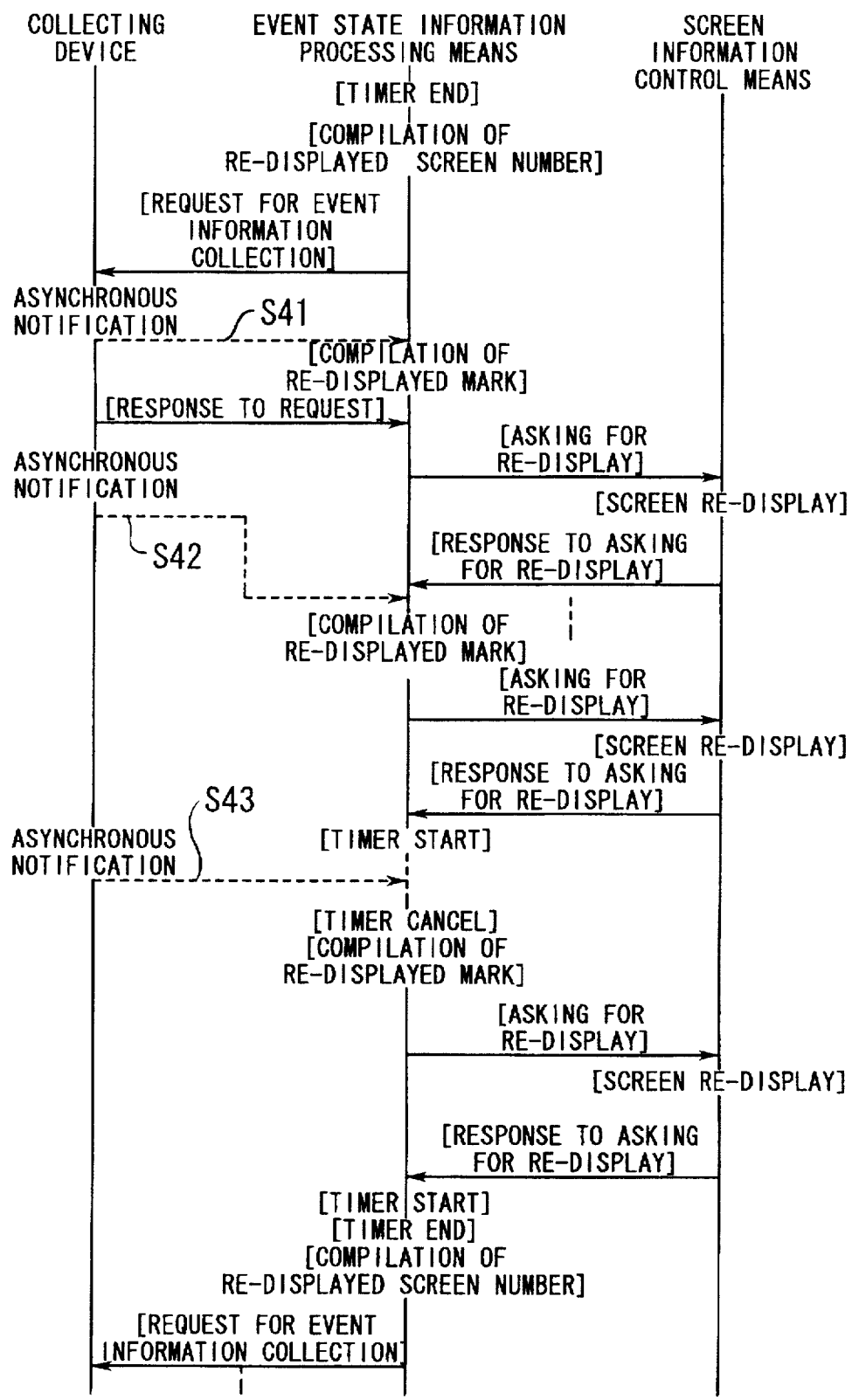
FIG. 9 is a diagram showing an operation sequence in the case where the monitor screen is updated by event state change and regular updating.

FIG. 9 is a diagram showing an operation sequence in the case where the monitor screen is updated by event state change and regular updating.

This operation sequence explains the operation of the monitor terminal 40 in the case where the mark on the monitor screen is updated by receiving the response notification of event state change information from the collecting device 30 and the response notification to the regular information request.

In this case, information is transmitted between the collecting device 30, the event state information processing means 41 and the screen information control means 42 of the monitor terminal 40, and the display means 50. In FIG. 9, the vertical line indicates the progress of time.

When the monitor screen is updated by the event state change notification and the response notification for regular updating, the operation is basically the same as that of the individual case described above. However, these operations take place at the same time, a load is imposed to both of the collecting device 30 and the monitor terminal 40. Therefore, the loads of the collecting device 30 and the monitor terminal 40 are lightened by exclusive control.

First, if the notification of event state change information is given asynchronously from the collecting device 30 between the time when the event state information processing means 41 requests the collecting device 30 to collect event information and the time when the response to the collection request is given (S41), the re-display is not made at the timing of the notification, and the event state information processing means 41 waits for the response notification to collection request and asks the screen information control means 42 for the re-display of screen.

Next, when the notification of event state change information is given asynchronously from the collecting device 30 during the re-display processing of screen (S42), the event state information processing means 41 performs the processing with respect to the notification after the re-display processing is completed.

Further, when the notification of event state change information is given asynchronously from the collecting device 30 during the time count for regular updating (S43), the event state information processing means 41 cancels the time count and performs the re-display processing. After the re-display processing is completed, the timer is started again.

Finally, the method of defining the screen transition information handled by the screen transition information control means 43 will be described. The screen transition information is defined by a description which starts with a keyword "STATUS" and ends with "END" for one screen. "STATUS" is a zone where the "control number" and the "information such as screen attribute necessary in displaying" are defined for each screen. Under this zone, the operation history at the screen transition time is defined.

The following is an example of definition in the case where the monitor screen is formed for each system.

```
$STATUS 1 information displayed on screen a
    % button ON notification    button number #
    transition processing transition to STATUS No. 2
$END
$STATUS 2 information displayed on screen b
    ...
$END
```

This definition example shows the case where the screen a of the screen control number "1" is changed into the screen b by the ON notification of button arranged on the screen a. The transition is executed by the ON notification of button specified by button number. During the execution of this processing, the screen a is erased.

The following is an example of definition in the case where monitor screen is formed by multiple display in which a plurality of screens are displayed at the same time.

```
$STATUS 1 information displayed on screen a
    % button ON notification    button number # screen
    preparation processing screen defined by STATUS No. 2
$END
$STATUS 2 information displayed on screen b
    ...
$END
```

This definition example shows the case where the screen a of the screen control number "1" is changed into the screen b by the ON notification of button arranged on the screen a. The transition is executed by the ON notification of button specified by button number. Even when the screen b is displayed, the screen a is not erased, and both of the screen a and the screen b are displayed.

The following is an example of definition in the case where the screens are changed going up along the history of screen transition.

```
$STATUS 1 information displayed on screen a
    % button ON notification    button number # stored
    screen transition processing
$END
$STATUS 2 information displayed on screen b
    ...
$END
```

This definition example shows the case where the screen a of the screen control number "1" is changed into the screen b going up the screen before being changed into the screen a by the ON notification of button arranged on the screen a. The transition is executed by the ON notification of button specified by button number. For example, when change is made from the screen b to the screen a and the definition described above is given on the screen a, the screen is changed into the screen b by the notification of button.

As described above, the display unit in accordance with the present invention is constituted so that the event state information transmitted between the collecting device 30 and the monitor terminal 40 is transmitted by a number corresponding to the event state of mark to be displayed, such as mark attribute, mark number, and event identification number, the transmitted number is limited to the number corresponding to state change, and the monitor screen is displayed according to the previously defined combination pattern of state change. Therefore, the load of information transmission between the collecting device 30 and the monitor terminal 40 is lightened significantly, so that the processing load in updating/displaying the screen can be lightened.

Also, by selecting a mark or an icon indicating the occurrence of fault from the monitor screen, even less-experienced operator can easily determine a specific fault point/fault condition.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A monitored state display unit for a monitoring system, which monitors a state change of various events occurring on a communication network, comprising:

event state information processing means which requests a collecting means, which collects information from a sensor for detecting the state change of the events, to collect event state information, or gives instructions as to a method of displaying an on-screen mark corresponding to the event state information on receipt of a notification of response to a request for collecting event information from the collecting means or one-way notification of state change information from the collecting means;

display method defining information storing means which defines and stores a method of displaying an on-screen mark corresponding to an object being monitored and the event state of said object being monitored as a variable element;

screen information control means which controls the output of updating/displaying of displayed screen in accordance with said method of displaying an on-screen mark, and receives the input of instruction information;

screen definition information storing means which stores information defining a displayed screen, and controls an updated screen in updating/displaying the displayed screen with a control number;

screen transition information control means which requests information necessary for the screen to be displayed next from said event state information processing means on receipt of a notification of input of said instruction information;

screen transition information storing means which stores screen transition information when the screen is changed;

display means which performs updating/displaying of said displayed screen; and instruction input means which inputs said instruction information.

2. A monitored state display unit for a monitoring system according to claim 1, wherein said event state information processing means collects event state information necessary for new display or re-display of monitor screen by a notification from said collecting means.

3. A monitored state display unit for a monitoring system according to claim 1, wherein said event state information processing means collects event state information necessary for new display or re-display of monitor screen by requesting regularly or as necessary to said collecting means.

4. A monitored state display unit for a monitoring system according to claim 1, wherein said event state information processing means handles the event state information which is not transmitted from said collecting means as information of unchanged event state.

5. A monitored state display unit for a monitoring system according to claim 1, wherein said event state information processing means has means for compiling the event state information given from said collecting means into only event state information necessary for new display or re-display of monitor screen.

6. A monitored state display unit for a monitoring system according to claim 1, wherein said event state information processing means has display method specifying means for collating the combination pattern of event state information given from said collecting means with a definition pattern defined by said display method defining information storing means and for specifying a display method defined in the matching definition pattern as a mark display method in newly displaying or re-displaying the monitor screen.

7. A monitored state display unit for a monitoring system according to claim 6, wherein said display method specifying means specifies the display of mark, numerical value, or character string or buzzer output in accordance with the event state.

8. A monitored state display unit for a monitoring system according to claim 1, wherein said event state information processing means has timer means for defining a information collection intervals in regularly updating the monitor screen.

9. A monitored state display unit for a monitoring system according to claim 1, wherein said event state information processing means performs re-display processing after waiting for the notification of response to collection request when asynchronous event state information is given from said collecting means during the collection request of event state information from said collecting means due to regular updating.

10. A monitored state display unit for a monitoring system according to claim 1, wherein said event state information processing means performs re-display processing in response to a notification after the completion of re-display processing when the notification of asynchronous event state information is given from said collecting means during the re-display processing of the monitor screen.

11. A monitored state display unit for a monitoring system according to claim 1, wherein said event state information processing means starts time count again after performing re-display processing in response to the notification by canceling the time count when the notification of asynchronous event state information is given from said collecting means during the time count for regular updating.

12. A monitored state display unit for a monitoring system according to claim 1, wherein said screen information control means controls the monitor screen for each system, and changes and displays the screen hierarchically from an outline screen to a detailed screen for each system.

* * * * *